Sept. 27, 1966 S. E. McALPIN 3,275,979
DYNAMICALLY OBTAINING NORMAL MOVEOUT CORRECTION
Filed April 29, 1963 2 Sheets-Sheet 1

United States Patent Office 3,275,979
Patented Sept. 27, 1966

3,275,979
DYNAMICALLY OBTAINING NORMAL
MOVEOUT CORRECTION
Silvan E. McAlpin, Dallas, Tex., assignor to Mobil Oil
Corporation, a corporation of New York
Filed Apr. 29, 1963, Ser. No. 276,528
6 Claims. (Cl. 340—15.5)

This invention relates to seismic exploration and, more particularly, to methods and systems for applying a normal moveout correction to seismic signals received at detectors which are horizontally spaced from a shot point.

In seismic exploration, acoustic waves generated by production of seismic impulses as by explosion of a charge of dynamite or by weight dropping techniques at near-surface sending stations are detected after reflection from subsurface interfaces to produce seismic signals which, by reason of time occurrence of reflection components therein, are related to the depth and the attitude of subsurface reflecting beds. Commonly, the seismic impulses are created by an explosion at a point referred to as the shot point and reflected waves are received at detectors at points spaced various distances from the shot point. The seismic signals received at the detectors are amplified and recorded on a magnetic tape together with the instant of shock initiation and subsequent time increments. From these records inferences can be drawn as to the structure of subterranean strata.

In order properly to evaluate the seismic signals, certain corrections must be applied to the received signals. For example, certain static corrections must be applied to the signals to correct for the thickness of the weathering layer at the surface of the earth and to correct for differences in elevation between the detectors and the shot point. In addition to these static corrections, certain dynamic corrections must be applied to the received seismic signals. The spacing of the detectors one from the other and the differing velocity of sound waves through the medium being explored require a dynamic correction which is commonly referred to as normal moveout correction.

These dynamic corrections are required because it is highly desirable to correct each trace on the seismograph for the geometry involved. As earlier explained, the plurality of detectors are respectively spaced at increasingly greater distances from the shot point. Accordingly, the time required for seismic waves to travel from the shot point to a reflecting interface to the most remote detector will be considerably greater than the corresponding travel time from shot point to the same interface to the nearest detector. The difference in the aforesaid travel times decreases with increase of depth. Accordingly, it has been common to apply to the several traces a normal moveout correction for the purpose of recording the signals received at the detector in the intervals following the instant of generation of seismic signals corresponding with vertical time below the detector.

Though normal movement correction has been accomplished in a number of different ways, none has been based upon the concept underlying the present invention which simplifies the apparatus without sacrifice of accuracy.

In carrying out the present invention, the normal moveout correction is achieved as a result of the vectorial addition of two quantities. More specifically, there are added together and at a 90° angle, one to the other, electrical signals representing the vertical travel time $T_0$ and the horizontal travel time between shot point and detector as determined by the expression $x/v$ where $x$ is equal to the distance between the shot point and the detector, and $v$ is the average velocity of the seismic waves during the travel from shot point to reflecting point and return to detector. As will be explained later, the foregoing concepts simplify the apparatus and provide ease in correcting the seismic data on a trace by trace basis. Thus, a signal proportional to the time $T_0$ is readily obtained from a slide-wire which generates a voltage which increases linearly with time. The quantity $x/v$ is represented by dividing a voltage proportional to the distance $x$ by average velocity represented by an output voltage obtained from a function generator.

Having thus determined what may be referred to as slant time $T_t$, the amount of moveout correction to be applied incrementally along the line of each trace is represented by the difference $\Delta T$ between this slant travel time $T_t$ and vertical travel time $T_0$.

Accordingly, it is an important object of the present invention to provide an improved normal moveout correction for a seismic trace by means of a system which approximates the slant travel time of a seismic wave by vectorially combining two electrical signals representing the vertical travel time of a wave from detector to interface and the horizontal distance between shot point and detector divided by the average velocity of a seismic wave.

The foregoing and other objects, features, and advantages of the present invention may be better understood from the following more detailed description taken in conjunction with the accompanying drawings in which.

Figure 1:
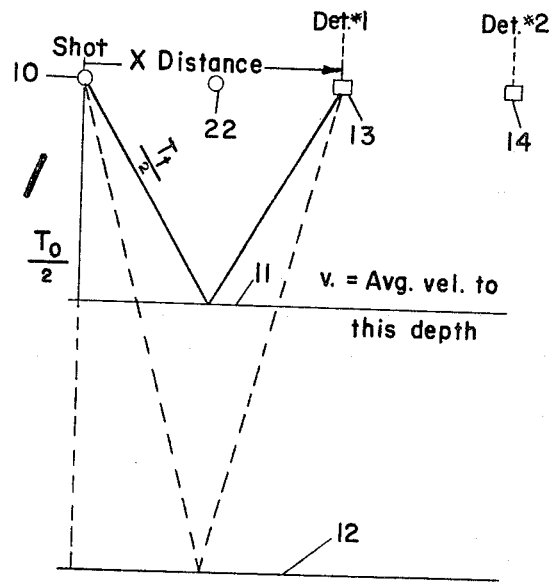
FIG. 1 shows the geometry of the shot point and detectors relative to several reflecting interfaces.

Referring to FIG. 1, there is shown the geometry of the shot point 10 and detectors 13–15 relative to reflecting beds shown as interfaces 11 and 12. Seismic impulses are generated by detonating a change of dynamite, or by other means, at the shot point 10. Impulses produced by this disturbance travel as seismic waves through the medium being explored and are reflected by interfaces 11 and 12. The reflected waves are detected by a plurality of detectors, only detectors 13, 14 and 15 being shown.

Ideally, it would be desirable to have the shot point at the same location as each detector so as to best obtain information about the depth of reflecting interfaces. In such case, the vertical time required for a wave to travel from the shot point to the detector would be directly indicative of the vertical distance between the shot point (or detector) and the reflecting interface. Such an idealized situation is not practical. Rather, it is standard practice to space a plurality of detectors 13, 14 and 15 at varying horizontal distances from the shot point 10. Therefore, the time required for a wave to travel from the shot point to, for example, the reflecting interface 11 and back to detector 13 is not directly indicative of the depth of the interface. Rather, this time must be corrected for the normal moveout or spacing of the detector from the shot point in order to gain useful information regarding the depth below each detector of the reflecting interface.

Figure 2:
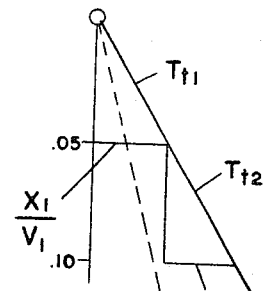
FIG. 2 shows the traces of three seismographic records.
Figure 2:
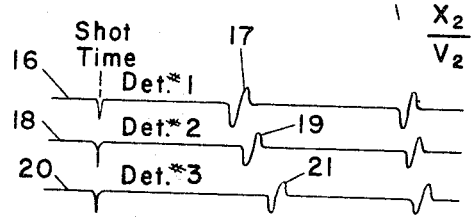

Before proceeding with a description of the circuitry used in carrying out the invention, reference is made to FIG. 2. This figure, showing three seismographic traces, which may, for example, be from the detectors 13, 14 and 15, may be helpful in better understanding the normal moveout correction provided by this invention. The trace 16, taken from the detector 13, indicates a wavelet at 17 which is a reflection of a seismic wave from the interface 11. Similarly, trace 18 from detector 14 indicates a wavelet at 19 which is the reflection of a seismic wave from the interface 11. Because the detector 14 is positioned at a further distance from shot point 10 than is detector 13, the wavelet or reflection at 19 occurs later in time because a slightly longer time is required for the seismic wave to travel from shot point 10 to detector 14 than is required for detector 13. Similarly, the trace 20 indicates a wavelet or reflection at 21 which occurs at a still later time due to the further spacing of the detector 15 from shot point 10. In order to best evaluate the three seismograms 16, 18 and 20, it is desirable to correct them to a common time base. The wavelets or reflections 17, 19 and 21, if occurring on a common time base, better indicate the nature and depth of the interface 11 beneath each of the detectors 13, 14 and 15.

It will be noted that the normal moveout correction, proportional to $\Delta T$, will be different for each seismographic trace due to the different distance $x$ of the associated detector from the shot point.

The normal moveout correction represents a dynamic correction which is required by reason of the differing spacing of the detectors from the shot point and the increasing depth from which reflections are received. Referring back to FIG. 1, assume the idealized condition is that in which the detector is positioned at the point 22 directly above the reflection points on the interfaces 11 and 12. Then, the vertical travel time of the wave between the point 22 and the reflecting point on interface 11 and return will be directly indicative of the depth of interface 11. However, this idealized vertical travel time, $T_0/2$, differs from the actual time required for the wave to travel from shot point to reflecting interface to detector by an amount equal to $T_t - T_0$. It can be seen that the difference between $T_t$ and $T_0$ is quite large when the wave is reflected from interface 11. Therefore, a large correction is required. Now, consider the situation in which the wave is reflected from interface 12. In this case, the total slant travel time $T_t$ more nearly approximates the vertical travel time $T_0$ and a smaller correction is required. Therefore, after shot time the dynamic normal moveout correction should decrease with in increase in time in order to compensate for the fact that reflections are being received from deeper and deeper interfaces and the slant travel times for waves reflected from these deeper interfaces more nearly approximate the actual vertical depth of the interfaces.

The manner in which this dynamic normal moveout correction is obtained will now be explained in terms of the equations applicable thereto.

The normal moveout correction which must be applied to the seismographic signal received at detector 13 is directly proportional to the difference $\Delta T$ between the total slant travel time $T_t$ and the total vertical travel time $T_0$. In accordance with this invention, the total slant travel time is determined vectorially in accordance with the following equations:

(1)
$$\frac{T_t}{2} = \left|\frac{x}{2v} - j\frac{T_0}{2}\right| \text{ or } T_t = \left|\frac{x}{v} - jT_0\right|$$

where:

$T_t$ is the total slant travel time from shot point to reflecting interface to detector;
$x$ is the distance between shot point and detector;
$v$ is the average velocity of the wave in the medium;
$j$ is the vector operator denoting a 90° difference in direction between the $x/v$ term and the $T_0$ term; and
$T_0$ is the vertical travel time which can also be thought of as the real time measured from shot time.

An inspection of FIG. 1 reveals that the distance $x$ is known. The average velocity for a given area under survey will also be known. Additionally, the vertical time $T_0$ increases linearly. Accordingly, the vertical travel time $T_0$ can be reproduced for tracking the seismogram at the times which successive increments represent.

In accordance with my invention, the above Equation 1 is solved by an electrical circuit which develops an alternating current (A.C.) signal having an amplitude proportional to $x/v$ and an A.C. signal having an amplitude proportional to $T_0$. These two signals are shifted apart in electrical phase by 90° in order to introduce the $-j$ operator in the above equation. The two A.C. signals are then summed to form an electrical signal proportional to $T_t$. Knowing $T_t$ and $T_0$, the latter can be subtracted from the former to produce the difference $\Delta T$, a signal proportional to the normal moveout correction to be dynamically applied to each trace of the seismogram.

Figure 1A:
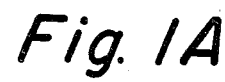
FIG. 1A shows a diagram representing an approximation used in the correction system.

It should be noted that in carrying out my invention an assumption is made which is best described with reference to FIG. 1A. FIG. 1A shows a portion of the $T_t/2$ line extending from the point 10 in FIG. 1. The total slant travel time $T_t$ is the sum of the increments of total slant travel time $T_{t1} + T_{t2} + T_{t3} + \ldots$. These incremental values of $T_t$ can be calculated at particular increments of real time which are denoted $T_{o1}, T_{o2}, T_{o3}, \ldots$. At each increment of real time the horizontal time is given by the quotient of the horizontal incremental distance divided by the calculated velocity at that depth. That is, the horizontal times are given by $x_1/v_1$, $x_2/v_2$, $x_3/v_3 \ldots$. It should be noted that the velocity at particular increments of real time $v_2$, $v_2$, $v_3$, $\ldots$ can be represented as the average velocity $v$. Therefore, in carrying out my invention, average velocity or the inverse of average velocity will be used in all of the calculations.

Figure 3:
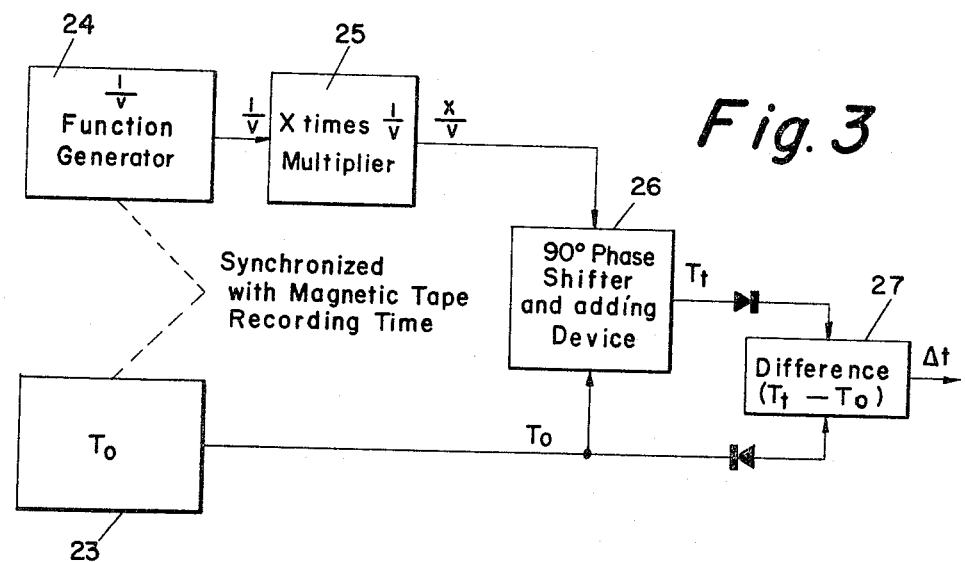
FIG. 3 shows a block diagram of the system used to obtain a signal which can be used to apply normal moveout correction.

The invention in its broader aspects may be carried out as indicated in block form in FIG. 3. In order to generate a signal proportional to $T_0$, real time after shot time, a function generator or device 23 is provided. This may be a potentiometer which has a zero output voltage until the shot time. After shot time, the voltage output of the device 23 increases linearly thereby denoting an increasing time after shot time.

A second function generator or device 24 is provided to develop a signal inversely proportional to the average velocity of the waves through the medium to be explored. The velocity of these waves through the medium being explored may vary with depth due to a number of factors. The average velocity $v$ may be obtained by a number of well-known methods. These include determination of average velocity from a continuous velocity log, or from the conventional bore hole geophone-shot-method, or from the expanding-spread-method of exploration. For a more detailed description of a method of providing a signal proportional to average velocity, reference is made to an article entitled "Applications of the Expanding Reflection Spread" by Albert W. Musgrave, a co-worker of mine, which appeared in Geophysics, vol. 27, pages 981–993, December 1962.

The voltage signal inversely proportional to average velocity is multiplied by a voltage proportional to the distance $x$ between shot point 10 and detector 13 in the multiplier 25. The electrical signals $T_0$ and $x/v$ are shifted in phase one from the other by 90° and summed in the device 26. The output of phase-shifting device 26 is a signal proportional to the total slant travel time $T_t$. In order to obtain a signal proportional to $\Delta T$, a summing device 27 is provided. The device 27 produces an output proportional to the difference, $\Delta T$, between $T_t$ and $T_0$. This output may be used dynamically to apply normal moveout correction to the trace for the particular detector from which the trace was received.

Figure 4:
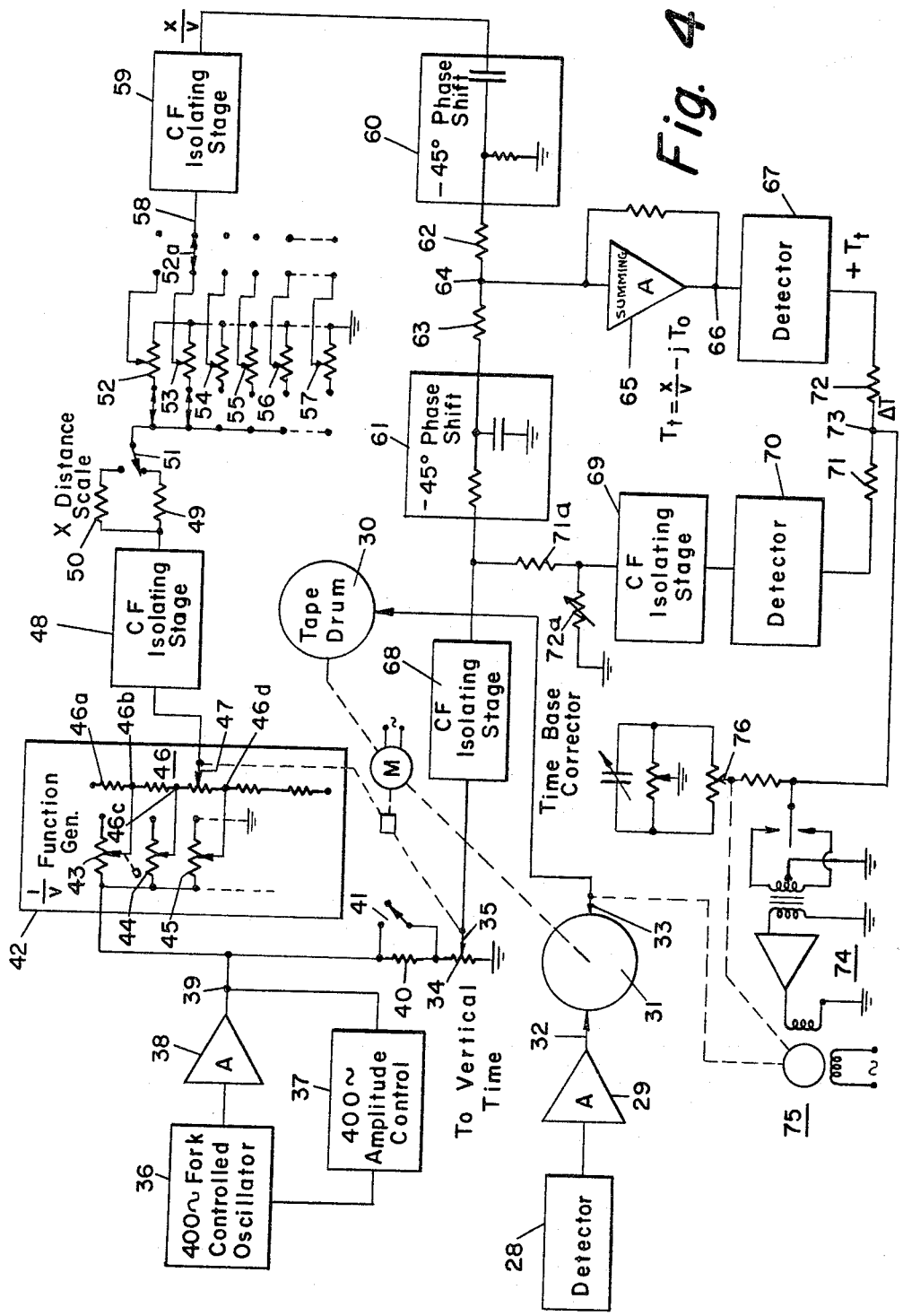
FIG. 4 shows in more detail the normal moveout correction system.

The invention is shown in more detail in FIG. 4. As shown in FIG. 4, seismic signals received from a detector 28 are amplified in amplifier 29. It is desired to delay these signals by a delay proportional to the normal moveout correction $\Delta T$ and then to record the seismic signals on the drum 30 to form a seismic record. In order to produce the normal moveout delay, a magnetic drum delay device 31 is provided. The seismic signals are recorded at transducer 32 and the pick-up head 33 is movable along the periphery of drum 31 in order to introduce the variable delay which is proportional to ΔT. While the drums 30 and 31 have been shown as driven by the same motor, it is not essential that the drum 31 be driven at the same speed as the drum 30.

In order to generate a signal proportional to ΔT, the circuitry presently to be described is provided. In order to generate a signal proportional to $T_o$, the potentiometer 34 is provided. Potentiometer 34 has a movable contact 35 which is driven by the same motor that drives the magnetic drum 30. A shot time the motor is started to drive the drum. At the same time, the motor moves the potentiometer contact 35 along potentiometer 34 to develop a linearly increasing voltage at the contact 35. The voltage at the contact 35 is an A.C. signal having an amplitude proportional to $T_o$.

In order to provide an A.C. signal at contact 35, the oscillator 36 is provided. The output of oscillator 36 is applied through amplifier 38 to provide a voltage of constant frequency at the point 39. In order to insure that the signal at the point 39 is of constant amplitude, an amplitude control circuit 37 is connected between point 39 and the oscillator 36 to control the amplitude thereof. The point 39 is connected by way of resistor 40 to the top of potentiometer 34. Under certain conditions, it is desirable to attenuate the voltage applied to potentiometer 34 by introducing the resistor 40 into the circuit. For example, when a different size drum 30 is used, the total travel time of the drum is changed. In this case, the voltage across the potentiometer 34 must be changed to compensate for the different time scale. Switch 41 is provided for this purpose.

Similarly, the constant amplitude A.C. voltage at point 39 is applied to the function generator 42 which develops a voltage inversely proportional to the average velocity of waves in the medium being surveyed. The function generator 42 includes potentiometers 43, 44 and 45, and other potentiometers, which attenuate the input voltage to make the voltage output of the potentiometers closely proportional to the inverse of average velocity.

The adjustable taps of each of the potentiometers 43, 44 and 45 are connected to taps on the potentiometer 46. The adjustable tap 47 of the potentiometer 46 is driven in synchronism with the tape drum 30. Therefore, the position of the adjustable tap 47 is indicative of time after shot time, referred to as real time. For example, the adjustable tap 47 is at the point 46a at shot time; at the point 46b at 0.05 millisecond after shot time; at the point 46c at 0.10 millisecond after shot time and so on. The potentiometers 43, 44 and 45 are set to values indicative of the inverse of average velocity for each of the associated times. For example, the potentiometer 43 is set to a value indicative of the inverse of average velocity at a time 0.05 millisecond after shot time. The potentiometer 44 is set to a value indicative of the inverse of average velocity at a time 0.10 millisecond after shot time and so on.

It should be noted that the spacing between the points 46c and 46d is greater than the spacing between the points 46b and 46c. The spacing between points 46c and 46d may indicate an interval time of 0.10 millisecond instead of 0.05 millisecond. The points 46a, 46b, 46c, . . . may be spaced at wider intervals on the potentiometer 46 at lower portions of the potentiometer 46. This is possible because the average velocity curve flattens out as time increases and closely spaced points are not required to accurately define the curve.

The output at the adjustable tap 47 is an A.C. voltage having an amplitude inversely proportional to average velocity at particular increments of real time, that is, time after shot time. This voltage decreases as time after shot time increases to compensate for the effect of increasing average velocity with increasing time.

This A.C. output is coupled through a cathode follower isolating stage 48 to a resistor network 49–50. Resistors 49 and 50 are selectively connected into the circuit by the switch 51 in order to change the scale of the horizontal distance. The horizontal distance $x$ is set by the variable resistors 52–57. These resistors are selectively connected into the circuit by a stepping switch 52a in order to produce a signal proportional to horizontal distance. The resistors 52–57 additionally perform the function of multiplying the signal inversely proportional to velocity by the distance. The output at point 58 is an A.C. signal having an amplitude proportional to horizontal distance divided by average velocity. This signal is coupled through an isloating cathode follower 59 to the phase shifter 60.

Phase shifter 60 introduces a 45° phase shift into the $x/v$ signal. The A.C. signal proportional to $T_o$ is also shifted in phase by 45° in phase shifter 61. Phase shifter 61 introduces a phase shift opposite to that of phase shifter 60 so that the respective outputs of phase shifters 60 and 61 are 90° out of phase. These outputs are connected through resistors 62 and 63 to common summing point 64. The two phase shifted signals are summed in summing amplifier 65 which performs the vectorial summing of the two signals. The signal at 66 has an amplitude proportional to the vectorial difference between the $T_o$ and the $x/v$ signals. The A.C. signal $T_t$ at 66 is converted to a D.C. signal in the detector 67.

The $T_o$ signal is coupled through cathode followers 68 and 69 to detector 70 which converts this A.C. signal to a D.C. voltage. Resistor 71a is provided in this path and is connected to a variable resistor 72a which attenuates the $T_o$ signal to correct it to the proper time base.

The output of detector 70 is of negative polarity and the output of detector 67 is of positive polarity. These two outputs are respectively connected through resistors 71 and 72 to the summing point 73. The two D.C. signals are combined at 73 to form a D.C. signal proportional to ΔT which can be used for applying a normal moveout correction to the received seismographic signals.

In order to introduce a delay proportional to the ΔT signal, a chopper amplifier 74 and servomotor 75 are provided. The servomotor positions the pick-up head 33 along the periphery of drum 31 to introduce the desired delay. As is conventional, the servomotor 75 also positions the movable arm 76 of the potentiometer. The servomotor 75 moves the arm 76 until the voltage on the arm 76 exactly equals the ΔT signal. Chopper amplifier 74 detects any unbalance between the voltage at potentiometer arm 76 and the ΔT voltage and drives servomotor 75 in a direction which does away with this unbalance.

While a particular embodiment of the invention has been shown and described, it will, of course, be understood that various modifications may be made without departing from the principles of the invention. The appended claims are, therefore, intended to cover any such modifications within the true spirit and scope of the invention.

What is claimed is:

1. In seismic exploration, the method of applying a normal moveout correction to seismic signals received from detectors spaced from a shot point comprising the steps of producing a first electrical signal proportional to the time between the real time and shot time, producing a second electrical signal proportional to the distance between the shot point and a particular detector divided by the average velocity of the seismic wave from the shot point to the reflecting beds, shifting the electrical phase relationship between said first and said second signals by 90°, combining said phase shifted signals to form a third electrical signal having an amplitude proportional to the slant travel time from said shot point to a reflecting interface to said particular detector, producing a difference signal proportional to the difference between the amplitude of said third signal and the amplitude of said first signal, and delaying said seismic signals received at the particular detector by a delay proportional to said difference signal to correct said seismic signals for normal moveout.

2. The method recited in claim 1 wherein the step of producing a second electrical signal includes the steps of producing a continuous signal indicative of the average velocity of sound waves in the medium being explored, producing an electrical signal proportional to the horizontal distance from said shot point to said particular detector, and combining said velocity signal and said distance signal to produce said second signal.

3. In seismic exploration, the method of applying a normal moveout correction to seismic signals received from a plurality of detectors spaced horizontally from a shot point comprising the steps of producing a first A.C. signal having a variable amplitude proportional to the time between real time and shot time, producing a second A.C. signal having a variable amplitude proportional to the distance between the shot point and a particular detector divided by the average velocity of the seismic wave from the shot point to the reflecting beds, shifting the electrical phase relationship between said first signal and said second signal by 90°, adding said phase shifted A.C. signals to form a third A.C. signal having an amplitude proportional to the slant travel time from said shot point to a reflecting interface to said particular detector, converting said third A.C. signal to a D.C. signal proportional to said slant time, converting said first A.C. signal to a D.C. signal proportional to said real time, producing a D.C. difference signal proportional to the difference between said real time D.C. signal and said slant time D.C. signal, and delaying the seismic signals from the particular detector by a delay proportional to said D.C. difference signal.

4. A normal moveout correction system of the type which applies static and dynamic moveout correction to seismic signals received at a detector spaced from a shot point comprising first means for producing a signal proportional to the time between real time and shot time, second means for producing a horizontal time signal proportional to the distance between the shot point and a particular detector divided by the average velocity of the seismic wave from the shot point to the reflecting beds, a phase shifter connected to said first means and to said second means for phase shifting by 90° said real time signal and said horizontal time signal one from the other and for combining said phase shifted signals to produce a slant time signal proportional to the slant travel time required for a wave to travel from said shot point to a reflecting interface and to said detector, and means for subtracting said real time signal from said slant time signal for producing an output proportional to the normal moveout correction required for seismic signals received at said detector.

5. The normal moveout correction system recited in claim 4 and a variable delay device, said output proportional to the normal moveout correction being applied to said variable delay device to control the delay thereof, said seismic signals received from said particular detector being applied to the input to said variable delay device, the output of said variable delay device being said seismic signals delayed by an amount proportional to the required normal moveout correction for that particular detector.

6. The normal moveout correction system recited in claim 4 wherein said first means for producing a signal proportional to said time between real time and shot time includes a potentiometer having a contact and an A.C. voltage source, said A.C. voltage source being applied across said potentiometer, means for moving the contact of said potentiometer continuously after shot time to produce an A.C. signal having a linearly varying amplitude at said contact.

References Cited by the Examiner

UNITED STATES PATENTS

| | | | |
|---|---|---|---|
| 2,440,971 | 5/1948 | Palmer | 340—15.5 |
| 2,800,639 | 7/1957 | Lee | 340—15.5 |
| 3,092,805 | 6/1963 | Koeijmans | 340—15.5 |
| 3,134,958 | 5/1964 | Burns | 340—15.5 |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,275,979                      September 27, 1966

Silvan E. McAlpine

It is hereby certified that error appears in the above numbered patent requiring correction and that the said Letters Patent should read as corrected below.

Column 1, line 59, for "movement" read -- moveout --; column 2, line 41, for "change" read -- charge --; column 4, line 30, for "$v_2$" read -- $v_1$ --.

Signed and sealed this 29th day of August 1967.

(SEAL)
Attest:

ERNEST W. SWIDER                                        EDWARD J. BRENNER
Attesting Officer                                          Commissioner of Patents

UNITED STATES PATENT OFFICE
CERTIFICATE OF CORRECTION

Patent No. 3,275,979 September 27, 1966

Silvan E. McAlpine

It is hereby certified that error appears in the above numbered patent requiring correction and that the said Letters Patent should read as corrected below.

Column 1, line 59, for "movement" read -- moveout --; column 2, line 41, for "change" read -- charge --; column 4, line 30, for "$v_2$" read -- $v_1$ --.

Signed and sealed this 29th day of August 1967.

(SEAL)
Attest:

ERNEST W. SWIDER
Attesting Officer

EDWARD J. BRENNER
Commissioner of Patents